United States Patent
Fratti et al.

(10) Patent No.: US 8,125,241 B2
(45) Date of Patent: Feb. 28, 2012

(54) AUTOMATIC DE-EMPHASIS SETTING FOR DRIVING CAPACITIVE BACKPLANE

(75) Inventors: Roger Fratti, Mohnton, PA (US); Dwight Daugherty, Ephrata, PA (US)

(73) Assignee: LSI Corporation, Milpitas, CA (US)

( * ) Notice: Subject to any disclaimer, the term of this patent is extended or adjusted under 35 U.S.C. 154(b) by 163 days.

(21) Appl. No.: 12/725,534

(22) Filed: Mar. 17, 2010

(65) Prior Publication Data

US 2011/0080237 A1    Apr. 7, 2011

Related U.S. Application Data

(60) Provisional application No. 61/249,324, filed on Oct. 7, 2009.

(51) Int. Cl.
   *H03K 17/16* (2006.01)
   *H03K 19/003* (2006.01)
   *H03K 5/12* (2006.01)

(52) U.S. Cl. .......................... 326/30; 327/170

(58) Field of Classification Search .................... 326/30, 326/86, 87; 327/108, 109, 170, 172–176; 365/189.05, 189.11
   See application file for complete search history.

(56) References Cited

U.S. PATENT DOCUMENTS

| | | | |
|---|---|---|---|
| 4,715,064 A * | 12/1987 | Claessen | 379/392 |
| 5,063,353 A | 11/1991 | Gubisch | |
| 6,801,043 B2 | 10/2004 | Tripathi et al. | |
| 7,069,165 B2 | 6/2006 | Rosenberg et al. | |
| 7,215,144 B2 * | 5/2007 | Mitby et al. | 326/82 |
| 7,538,573 B2 | 5/2009 | Kim et al. | |
| 7,586,987 B2 | 9/2009 | Vorenkamp et al. | |
| 7,884,648 B2 * | 2/2011 | Broyde et al. | 326/86 |
| 2008/0218222 A1 | 9/2008 | Nishi | |
| 2008/0240291 A1 * | 10/2008 | Tanabe | 375/300 |

OTHER PUBLICATIONS

George Steber; An LMS Impedance Bridge; QEX; Sep./Oct. 2005; Newington, CT.

Murcia Martinez, European Search Report, Mar. 22, 2011.

* cited by examiner

*Primary Examiner* — Shawki S Ismail
*Assistant Examiner* — Dylan White

(57) ABSTRACT

In described embodiments, automatic de-emphasis setting is provided for driving a capacitive backplane. Line impedance and line length of a transmission (TX) device are measured that form a load impedance of a driver. For some exemplary embodiments, the line impedance is predominantly a line capacitance, and such embodiments detect this capacitance. Measured line impedance is converted to a control signal (such as, for example, a three bit digital control signal) which automatically sets the de-emphasis of the TX stage. With the amount of capacitance and the length of the transmission line, the appropriate de-emphasis settings might be determined, and such de-emphasis setting be applied by the transmitter to the driver to compensate for transmission line effects.

20 Claims, 6 Drawing Sheets

500

600

AUTOMATIC DE-EMPHASIS SETTING FOR DRIVING CAPACITIVE BACKPLANE

CROSS-REFERENCE TO RELATED APPLICATIONS

This application claims the benefit of the filing date of U.S. provisional application No. 61/249,324, filed on Oct. 7, 2009, the teachings of which are incorporated herein by reference.

BACKGROUND OF THE INVENTION

1. Field of the Invention

The present invention relates to circuits, and, in particular, to adaptive de-emphasis setting for backplanes and the like.

2. Description of the Related Art

Many communication systems employ transmission of data from a transmitter to a receiver through a transmission media. In serial communication applications, components such as integrated circuits (ICs) are typically mounted on a circuit board and are electrically coupled to each other by a plurality of circuit board conductors, commonly known as traces, which may be on a printed circuit board or on a backplane. Traces provide a transmission media for signals, such as power, ground references, and input/output signals to and from each component. Normally, high-frequency signals between components via the traces are adversely affected by parasitic resistance, inductance, and capacitance inherent in such interconnections. Further, impedance mismatches between a transmitter and the various signal transmission media (traces and other circuit board components) of the signal transmission path, as well as between a receiver and the various signal transmission media of the signal transmission path, may produce signal reflections at the transmitter end and/or the receiver end of the signal transmission path. Such signal reflections may propagate along the transmission path and may potentially degrade system performance. As a result, it is highly desirable to closely match the output impedance of the transmitter circuit to the various components including the signal transmission path, and the input impedance of the receiver.

Generally, there is a trade-off between the length of the transmission media and the bit error rate (BER). This trade-off occurs because the transmission media causes frequency distortion that contributes to inter-symbol interference. Consequently, some applications employ a de-emphasis circuit to condition signals prior to being applied to the transmission media. The de-emphasis circuit is a form of transmitter equalization circuit that pre-distorts an input signal to compensate for at least some of the frequency distortion in the data that is caused by the transmission line in the data link. Compensation for the frequency distortion at the output of the transmission line flattens the amplitude response of the output signal, and thereby improves the bit error rate (BER).

FIG. 1 shows a block diagram of a de-emphasis circuit 100 for backplane and cable applications of the prior art. Driver 102 is employed to receive an input data signal, provide gain (e.g., current gain) to the signal, and provide the data signal to transmission (TX) media 104 for transmission to receiver (RX) 106. As shown in FIG. 1, driver 102 provides current gain through the combination of current sources 108 and 110. If 100% of the current flows through current source 108, then adjustment of the percentage of current flowing through current source 110 adjusts the current provided to driver 102 that drives the output data signal. Latch 112 (shown as a D flip-flop) and XOR gate 114 provide control of the current source 110 that applies the de-emphasis, changing the de-emphasis setting depending on whether there is a transition in the input data bit sequence.

FIG. 2 shows a graph of exemplary de-emphasis selected to compensate for dispersion of the transmission stage media where multiple levels of de-emphasis might be selected based on number of bits of a given type received. As shown, the appropriate de-emphasis changes depending on whether a transition in the data bits is detected, since a transition (rise or fall) generally requires greater gain from the driver. Therefore, for the first bit after a transition, greater gain is required, with each additional n'th bit of the same value requiring less gain.

FIG. 3 shows an exemplary circuit schematic of the prior art allowing for adjustable de-emphasis using user-programmed de-emphasis through adjustable current sources. Similar to the circuit of block diagram of FIG. 1, FIG. 3 shows differential driver 302 coupled to combination of current source 308 and current sources 310a, 310b, and 310c. Differential latch 312 (shown as a D flip-flop) and differential XOR gate 314 provide control of the current sources 310a, 310b, and 310c based on the presence or absence in transitions of the input data to driver 302. Current sources 310a, 310b, and 310c operate in a similar manner to that of current source 110 of FIG. 1, except that, with three current sources, each of current sources 310a, 310b, and 310c might be separately enabled or disabled through control signals (Vcontrol1, Vcontrol2, and Vcontrol3) to provide multiple levels of de-emphasis (shown as User Programmed De-emphasis 0dB, 1.8dB, 3.5dB, and 6.2dB). Such exemplary circuit of FIG. 3 allows appropriate de-emphasis setting for different values of gain depending on whether the first bit after transition was detected or if subsequent bits were detected.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention provides for setting de-emphasis of a transmitter driver coupled to a receiver through a transmission media by coupling an impedance measuring circuit to the transmission media, the receiver in a high-impedance state and enabling, through a de-emphasis controller, the impedance measuring circuit. The impedance measuring circuit measures at least one of a line impedance and a line length of the transmission media, the transmission media an unbalanced load. The de-emphasis controller sets gain of the driver based on the measured at least one of the line impedance and the line length.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Embodiments of the present invention automatically detect line impedance, such as a capacitance, and line length of a transmission (TX) device that form a load impedance of a driver. For some exemplary embodiments described herein, the line impedance is predominantly a line capacitance, and such embodiments detect this capacitance. Measured line impedance is converted to a control signal (such as, for example, a three bit digital control signal) which automatically sets the de-emphasis of the TX stage. With the amount of capacitance and the length of the transmission line, the appropriate de-emphasis settings might be determined, and such de-emphasis setting be applied by the transmitter to the driver to compensate for transmission line effects.

Figure 1:
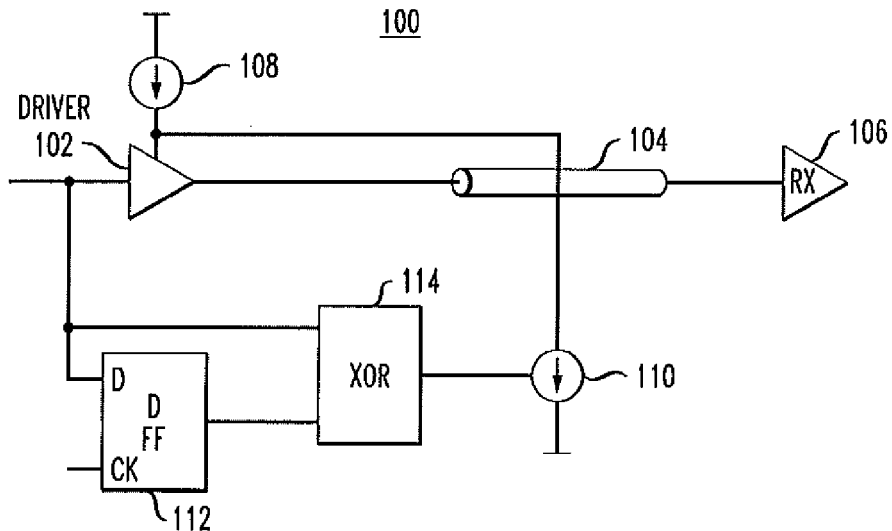
FIG. 1 shows a block diagram of a de-emphasis circuit for backplane and cable applications of the prior art.
Figure 2:
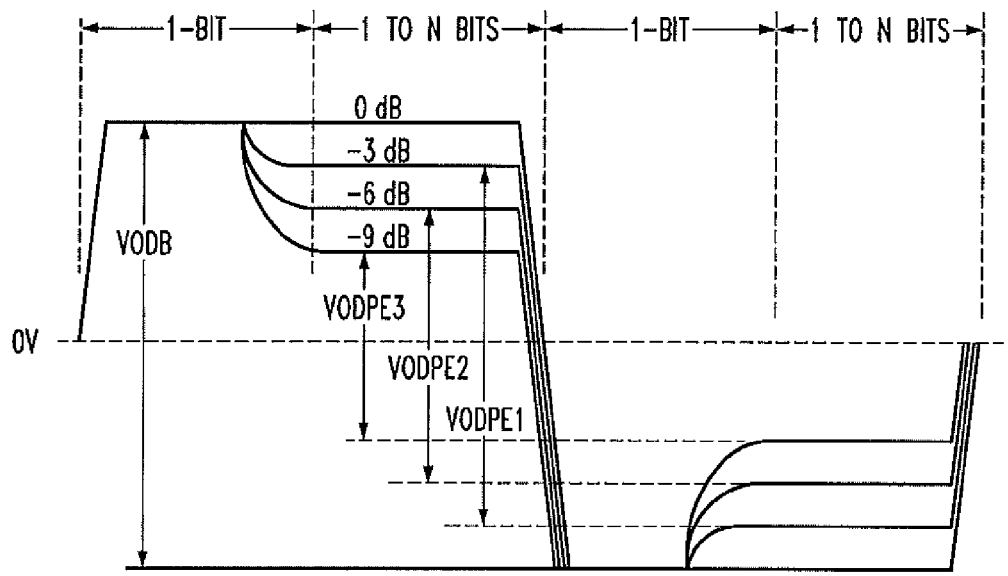
FIG. 2 shows a graph of exemplary de-emphasis selected to compensate for dispersion of the transmission stage media for the circuit of FIG. 1.
Figure 3:
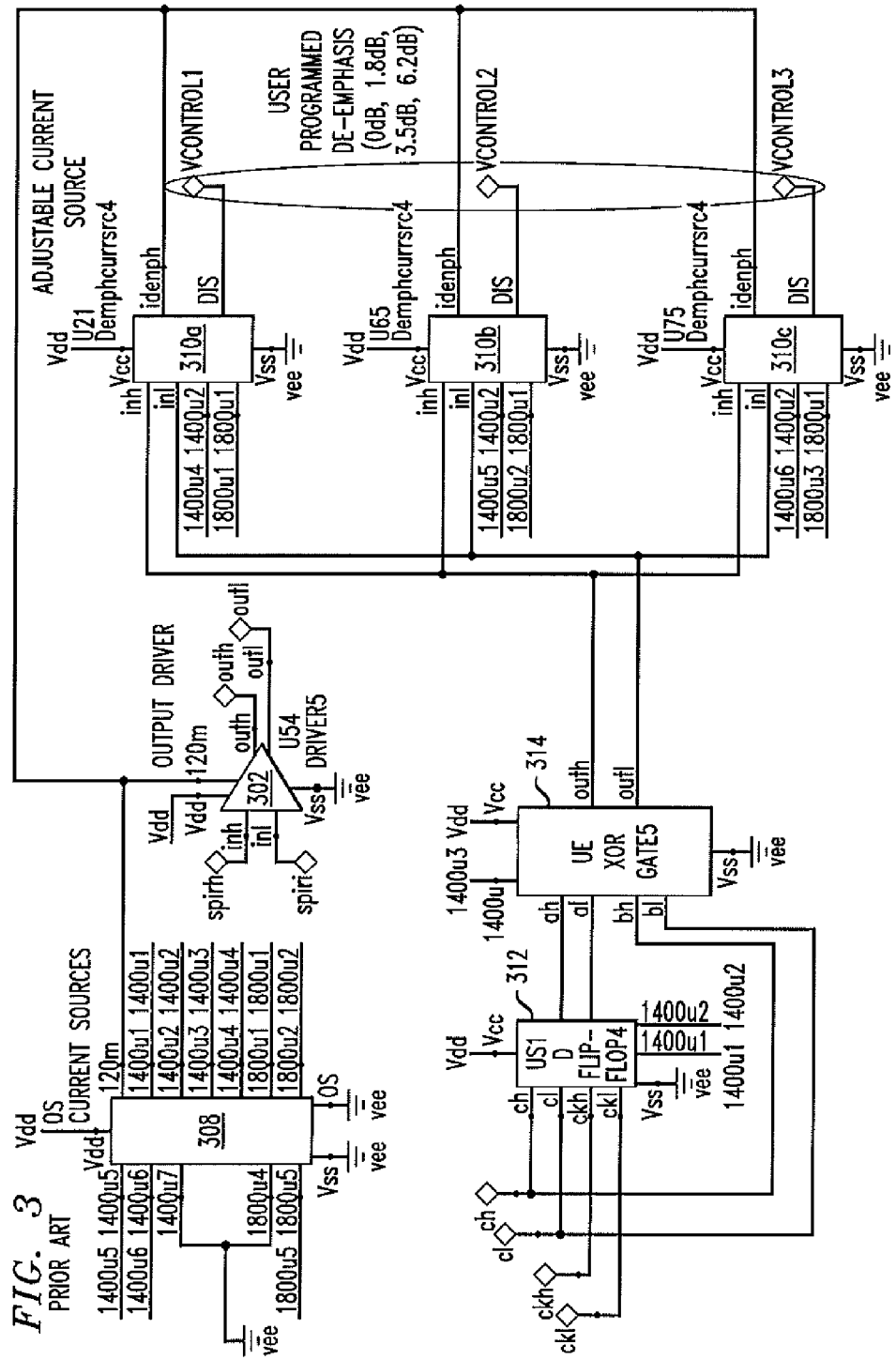
FIG. 3 shows an exemplary circuit of the prior art allowing for adjustable de-emphasis using user-programmed de-emphasis through adjustable current sources.

A de-emphasis circuit, such as shown in the exemplary block diagram of FIG. 1, might be configured for determination of electrical characteristics of a backplane or cable, and such determination might be made when the receiver is powered down to present a high impedance. Under such condition, the input impedance $Z_{in}$ is approximated by the relationship of equation (1):

$$Z_{in} = -jZ_o \cot(\beta l) \quad (1)$$

where $Z_o$ the characteristic impedance for the particular transmission media employed, l is the length of the transmission media, and $\beta$ is a propagation constant derived for the transmission media.

Figure 4:
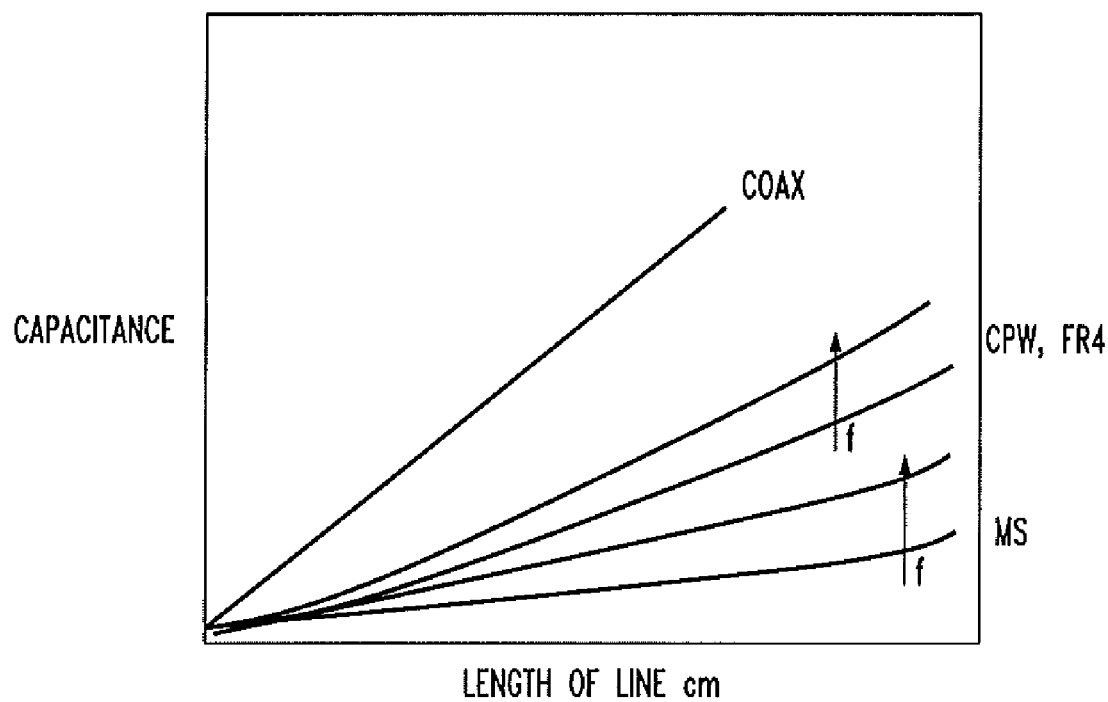
FIG. 4 shows a graph illustrating the changes in capacitance versus transmission media length for various transmission media.

Using equation (1), FIG. 4 shows a graph illustrating the changes in capacitance versus transmission media length for various types of transmission media. In FIG. 4, "coax" refers to coaxial cable, "CPW" refers to a type of copper-plated waveguide, "FR4" refers to a copper/dielectric laminate transmission line, and "MS" refers to micro-strip transmission line. The propagation constant for various transmission media is ~0.938/inch for CPW, ~0.827/inch for MS, and ~1.06/inch for coax (50 ohm, dispersive media on 25 mil FR4, and coax being teflon dielectric). As these exemplary propagation constants illustrate there is only an ~22% spread in the propagation constants, so dependence on media type is relatively small.

Figure 5:
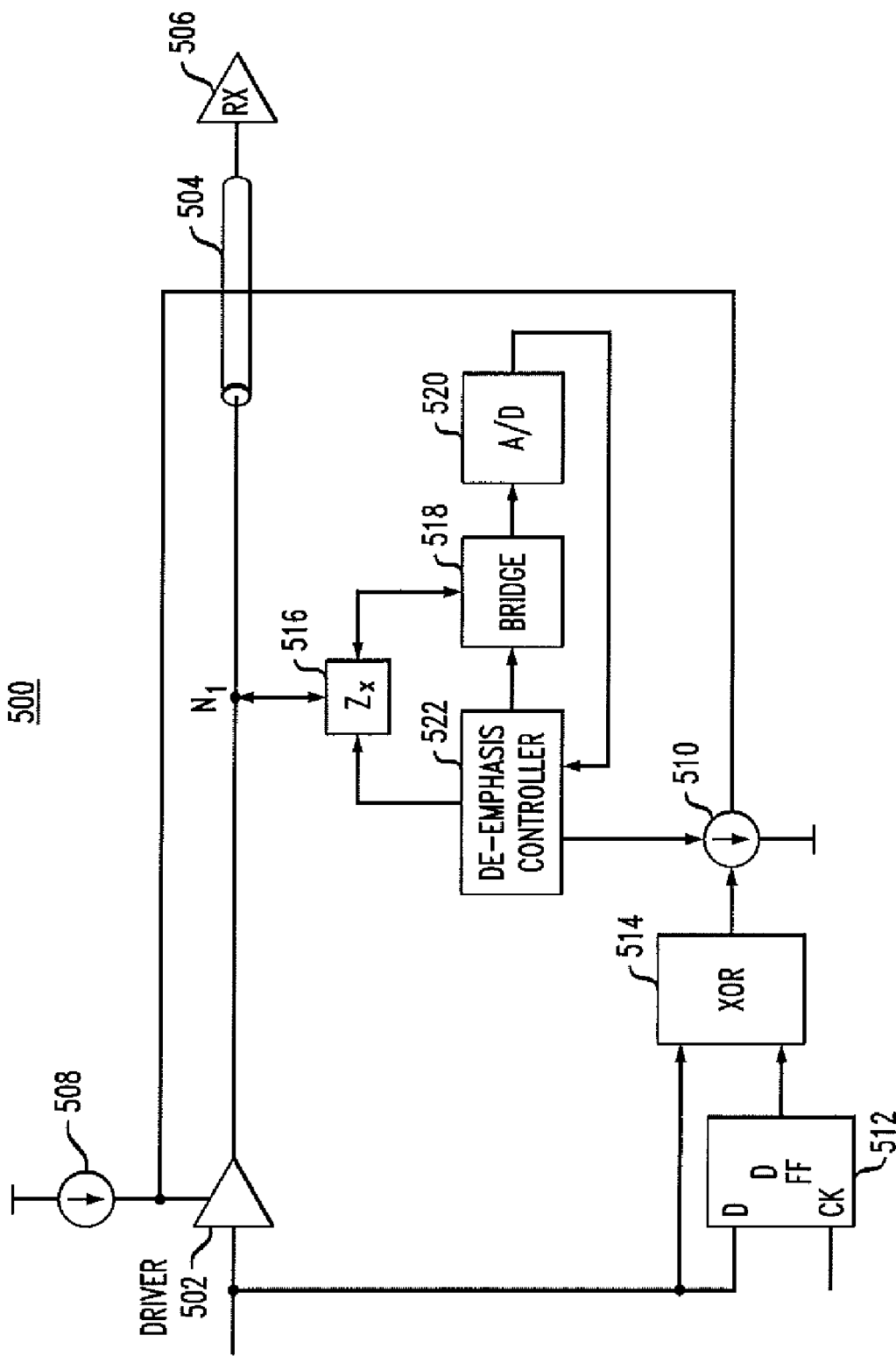
FIG. 5 shows a block diagram of a de-emphasis circuit in accordance with a first exemplary embodiment of the present invention.

FIG. 5 shows a block diagram of de-emphasis circuit 500 in accordance with a first exemplary embodiment of the present invention. Driver 502 is employed to receive an input data signal, provide gain (e.g., current gain) to the signal, and provide the data signal to transmission (TX) media 504 for transmission to receiver (RX) 506. As shown in FIG. 5, driver 502 provides current gain through the combination of current sources 508 and 510. If 100% of the current flows through current source 508, then adjustment of the percentage of current flowing through current source 510 adjusts the current provided to driver 502 that drives the output data signal. Latch 512 (shown as a D flip-flop) and XOR gate 514 provide control of the current source 510 that applies the de-emphasis, changing the de-emphasis setting level depending on whether there is a transition in the input data bit sequence. De-emphasis controller 522, as described subsequently, provides levels of de-emphasis tailored to the measured impedance of TX media 504 employed by current source 510 when selected by XOR gate 514.

In accordance with the first exemplary embodiment of the present invention, de-emphasis circuit 500 further comprises impedance switch (Zx) 516, which might be implemented as a T-gate, bridge circuit 518, and analog-to-digital (A/D) converter 520. Based on a control signal, Zx 516 couples bridge circuit 518 to the output node $N_1$ of driver 502, which node $N_1$ is also coupled to load impedance (comprising TX media 504 and input impedance of RX 506). Based on the control input signal from bridge circuit 518, Zx 516 is enabled or disabled, corresponding to a low-impedance or a high impedance, respectively, between output node $N_1$ and corresponding bridge circuit 518. When enabled, Zx 516 switches on (conducting) with a low impedance, allowing bridge circuit 518 to connect to output node $N_1$. While Zx 516 is disabled (non-conducting), bridge circuit 518 is effectively disconnected from output node $N_1$, since it appears as very high (near infinite) impedance.

A T-gate might be realized as a circuit including one N-type and one P-type transistor connected in parallel and controlled by inverted gate voltages. This combination of N-type and P-type transistors allows for efficient switching in CMOS technology. If the gate voltage of the N-type transistor is 'GND', the P-type transistor has a gate voltage of 'VCC' and both transistors are non-conducting. On the other hand, if the gate voltage of the N-type transistor is 'VCC' and the gate voltage of the P-type transistor is 'GND', both transistors are conducting. If the source voltage is near VCC, there is a voltage drop across the N-type transistor but (almost) no voltage drop across the P-type transistor. If the source voltage is near GND, the N-type transistor has (almost) no voltage drop. Because of the symmetry of standard MOS transistors, generally source and drain are not differentiated in a T-gate.

Bridge circuit 518 measures impedance seen at its input terminals, while A/D converter 520 is employed to quantize and convert the impedance measured by bridge circuit 518 to a digital value. A bridge circuit is a type of electrical circuit in which the current in a conductor splits into two parallel paths and then recombines into a single conductor, thereby enclosing a loop, which is used for measurement of unknown circuit impedance values. Each path comprises two or more impedance elements (e.g., resistors, capacitors, inductors, etc.). In one path, a first element has a known impedance and a second element has a variable impedance, and, in the other path, a third element has a known impedance and a fourth element has an impedance for which measurement is desired. All are based on the same principle, which is to compare the output of two potentiometers sharing a common source, to determine the unknown circuit element's impedance value. The well-known bridge circuit, the Wheatstone bridge, is used for measuring resistance, and has been modified to measure impedance in AC circuits. Such modified bridge circuits include Wien bridge, the Maxwell bridge and the Heaviside bridge. In these bridge circuits, the load impedance is assumed to be a balanced load impedance.

Impedance values of backplanes, however, tend to be unbalanced load impedances, so a modified bridge circuit account for unbalanced load is desirably employed for embodiments of the present invention. One such bridge circuit is known as the Least Mean Square (LMS) impedance bridge circuit. LMS impedance bridge circuits and to measure impedance of an unbalanced load are known in the art and described in, for example, Dr George R. Steber, *LMS Impedance Bridge*, WB9LVI, QEX, 2005, the teachings of which are incorporated herein in their entirety by reference.

In operation, de-emphasis circuit 500 enters calibration mode and measures impedance, such as the capacitance, directly. During calibration mode, receiver 506 enters a high input impedance mode so as to appear as an open circuit to driver 502. At calibration mode, Zx 516 is enabled and switches on (conducting) with a low impedance, allowing bridge circuit 518 to connect to output node $N_1$. Bridge circuit 518 measures impedance seen at its input terminals, while A/D converter 520 quantizes and converts the impedance measured by bridge circuit 518 to a digital value. The digital value from A/D 520 is provided to de-emphasis controller 522, and de-emphasis controller 522 then provides the appropriate de-emphasis settings to current source 510. Such settings might be determined off-line and associated with differing values of line impedance of TX media 504. Such settings might then be stored in memory coupled to de-emphasis controller 522 for use during calibration.

Figure 6:
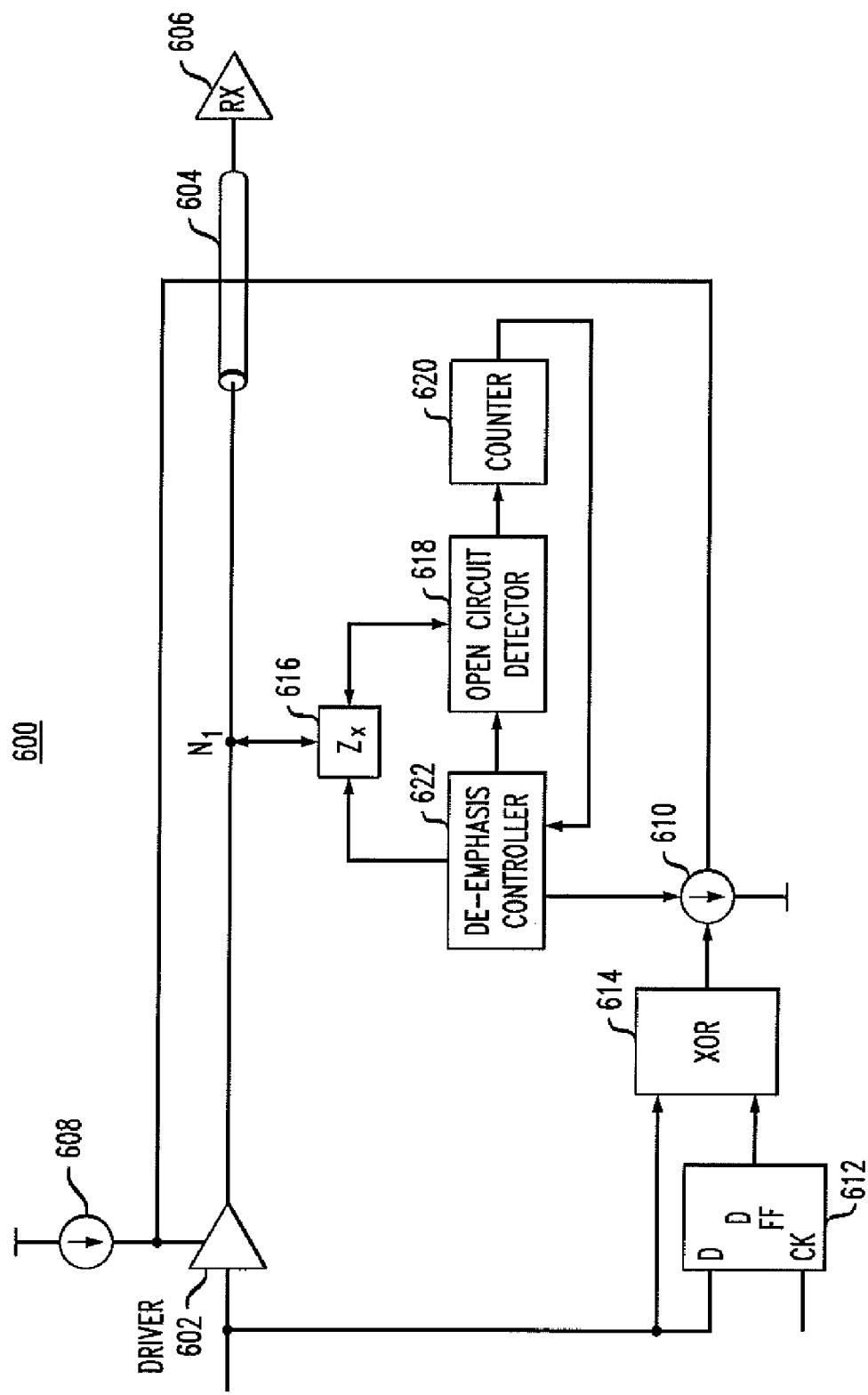
FIG. 6 shows a block diagram of a de-emphasis circuit in accordance with a second exemplary embodiment of the present invention.

FIG. 6 shows a block diagram of de-emphasis circuit 600 in accordance with a second exemplary embodiment of the present invention. Embodiments of de-emphasis circuit 600 might employ techniques of time-domain reflectometry as described subsequently, and de-emphasis circuit 600 comprises circuitry adapted to automatically determine a length of the transmission media line. Driver 602, TX media 604, RX 606, current sources 608 and 610, Zx 616, latch 612 (shown as a D flip-flop) and XOR gate 614 operate analogously to similar elements described previously with respect to FIG. 5. De-emphasis controller 622, as described subsequently, provides levels of de-emphasis tailored to the measured impedance of TX media 604 employed by current source 610 when selected by XOR gate 614 based on calculated impedance using a propagation constant and estimated length for TX media 604.

De-emphasis circuit 600 further comprises open circuit detector 618 and counter 620. Open circuit detector 618, when coupled to node $N_1$, measures the beginning of a pulse, such as a bit, from driver 602. When the beginning of the pulse is detected, open circuit detector 618 provides an enable signal to counter 620 to begin counting units of time. Open circuit detector 618 detects the end of the pulse, while continuing to provide the enable signal to counter 620. Open circuit detector 618 then waits until it again detects the beginning of a reflected pulse, which represents the reflection of the pulse within TX media 604 when terminated in a high impedance (RX 606 exhibits a high impedance and near unity reflection coefficient). When open circuit detector 618 detects the beginning of a reflected pulse, the enable signal is discontinued, and counter 620 stops counting units of time. The value in counter 620 thus represents the round trip delay of the pulse and its reflection, from which the length of TX media 604 can be determined based on a particular propagation constant for the particular type of TX media 604.

In operation, de-emphasis circuit 600 enters calibration mode and measures impedance, such as the capacitance, by estimating the length of TX media 604 through estimation of the delay of a reflection of a pulse, such as an output bit, from driver 602. During calibration mode, receiver 606 enters a high input impedance mode so as to appear as an open circuit to driver 602. At calibration mode, Zx 616 is enabled and switches on (conducting) with a low impedance, allowing open circuit detector 618 to connect to output node $N_1$. Open circuit detector 618 in combination with counter 620 determines delay of the reflection of a pulse, such as an output bit, from driver 602 seen at its input terminals, Output of counter 620 provides a digital value representative of the delay. The digital value of counter 620 is provided to de-emphasis controller 622. De-emphasis controller 622 uses the delay value to estimate a length of TX media 604 based on a propagation constant for the media, and then, based on the per unit length impedance and, for example, the relation of equation (1), then provides the appropriate de-emphasis settings to current source 610. Such settings might be determined off-line and associated with differing values of line impedance of TX media 604. Such settings might then be stored in memory coupled to de-emphasis control circuit 622 for use during calibration.

Figure 7:
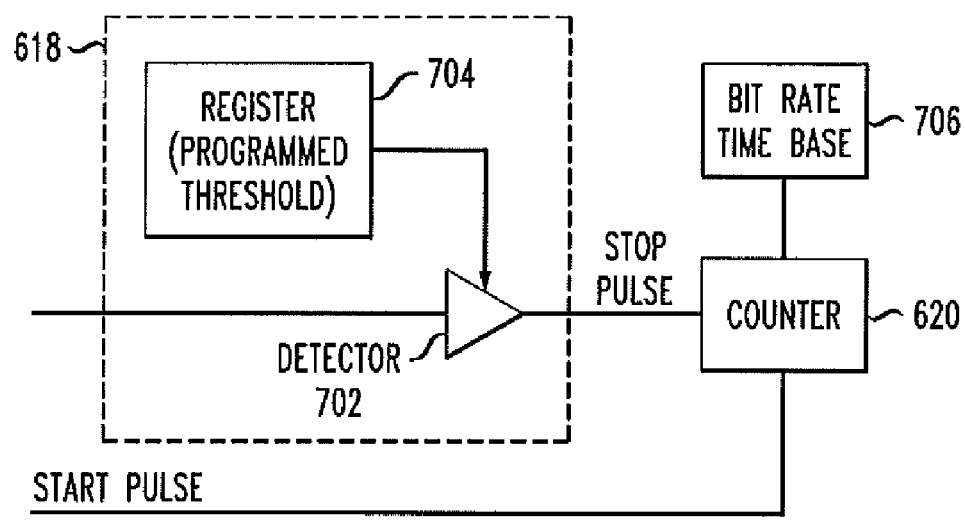
FIG. 7 shows an exemplary open circuit detector as may be employed with an embodiment of the present invention shown in FIG. 6.

FIG. 7 shows an exemplary embodiment of open circuit detector 618 as may be employed with embodiments of the present invention shown in FIG. 7. Detector 702 receives an input signal from, for example, driver 602. The input signal might be considered a start pulse, which is also provided to counter 620 to enable counting. The clock of counter 620 might be provided by clock 706 corresponding to the bit rate time base. Detector 702 continues to compare the input signal to a programmed threshold provided from a register 704. The programmed threshold corresponds to an amplitude above the pulse amplitude, which occurs when the reflected pulse interferes with the pulse from driver 602. When the input signal reaches the programmed threshold, the detector issues a stop pulse to disable counting. The value in counter 620 then corresponds to the round trip transmission time through the transmission media (e.g., TX media 604).

Figure 8:
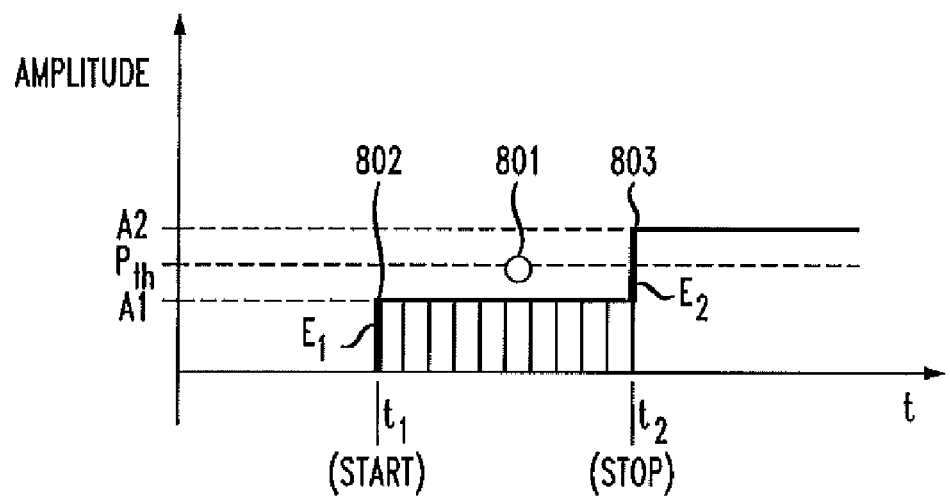
FIG. 8 illustrates the signal employed by the exemplary embodiment of open circuit detector of FIG. 7.

FIG. 8 illustrates the signal employed by the exemplary embodiment of open circuit detector 618 of FIG. 7. The start pulse is a rising edge El occurring at time $t_1$, and the programmed threshold $P_{th}$ 801 is set above the amplitude Al 802 of E1. At time $t_2$, the reflected pulse appears as a subsequent rising edge E2 with amplitude A2, above the threshold value $P_{th}$ 801, causing a stop pulse to be triggered.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of setting de-emphasis of a transmitter driver coupled to a receiver through a transmission media, the method comprising:
    coupling, based on a control signal from a bridge circuit, an impedance measuring circuit to the transmission media, the receiver in a high-impedance state, thereby enabling an impedance switch;
    enabling, through a de-emphasis controller, the impedance measuring circuit;
    measuring, by the impedance measuring circuit, at least one of a line impedance and a line length of the transmission media, the transmission media an unbalanced load; and
    setting, by the de-emphasis controller, gain of the driver based on the measured at least one of the line impedance and the line length.

2. The invention as recited in claim 1, wherein the measuring comprises:
    coupling the bridge circuit to the transmission media;
    adjusting the bridge circuit to measure the impedance of the unbalanced load; and
    providing the measured impedance of the unbalanced load.

3. The invention as recited in claim 2, wherein the bridge circuit is a Least Mean Squares (LMS) bridge.

4. The invention as recited in claim 1, wherein the measuring comprises:
    coupling an open circuit detector to the transmission media at a node;
    providing a pulse from the driver to the transmission media;
    detecting a reflected pulse from the transmission media;
    generating a delay value based on the round-trip delay of the reflected pulse;
    calculating a line length from the delay based on a predetermined algorithm;
    determining the line impedance of the unbalanced load from the line length and a type of the transmission media; and
    providing the measured impedance of the unbalanced load to the de-emphasis controller.

5. The invention as recited in claim 4, wherein the detecting of the reflected pulse comprises:
    enabling a counter on a rising edge of the pulse from the driver at the node;
    comparing an amplitude of a signal at the node with a threshold; and
        if the amplitude reaches the threshold, disabling the counter.

6. The invention as recited in claim 5, wherein the delay value is based on a value of the counter when disabled.

7. The invention as recited in claim 1, the coupling of the impedance measuring circuit comprises i) coupling the impedance switch between the impedance measuring circuit and an output mode of the driver and ii) changing the impedance switch from a high impedance state at the node to a low impedance state at the node.

8. The invention as recited in claim 7, where for the coupling of the switch, the switch is embodied as a T-gate switch.

9. The invention as recited in claim 7, wherein for measuring, by the impedance measuring circuit the transmission media is at least one of coaxial cable, copper-plated waveguide, copper/dielectric laminate transmission line, and micro-strip transmission line.

10. The invention as recited in claim 1, wherein the setting, by the de-emphasis controller, the gain of the driver comprises reading a set of de-emphasis settings from memory corresponding to the measured line impedance and a type of the transmission media, and providing the set of de-emphasis settings to a gain circuit of the driver.

11. The invention as recited in claim 1, wherein the impedance of measuring circuit comprises:
an open circuit detector coupled to the transmission media at a node, the open circuit detector configured to detect a reflected pulse from the transmission media in response to a pulse provided from the driver to the transmission media; and
a counter coupled to the open circuit detector generating a delay value based on the round-trip delay of the reflected pulse,
wherein the de-emphasis controller is configured to calculate a line length from the delay based on a predetermined algorithm, and determine the line impedance of the unbalanced load from the line length and a type of the transmission media to provide the measured impedance of the unbalanced load.

12. The invention as recited in claim 11, wherein the open circuit detector detects the reflected pulse by:
enabling the counter on a rising edge of the pulse from the driver at the node;
comparing an amplitude of a signal at the node with a threshold; and
if the amplitude reaches the threshold, disabling the counter, the delay value based on a value of the counter when disabled.

13. An apparatus for setting de-emphasis of a transmitter driver coupled to a receiver through a transmission media, the apparatus comprising:
an impedance measuring circuit coupled to the transmission media based on a control signal from a bridge circuit, the receiver in a high impedance state; and
a de-emphasis controller adapted to enable the impedance measuring circuit;
wherein, when enabled, the impedance measuring circuit is further configured to measure at least one of a line impedance and a line length of the transmission media, the transmission media an unbalanced load, and
wherein the de-emphasis controller is further configured to set gain of the driver based on the measured at least one of the line impedance and the line length.

14. The invention as recited in claim 13, wherein the bridge circuit is coupled to the transmission media, and wherein the impedance measuring circuit adjusts one or more elements of the bridge circuit to measure the impedance of the unbalanced load; and provides the measured impedance of the unbalanced load to the de-emphasis controller.

15. The invention as recited in claim 14, wherein the bridge circuit is a Least Mean Squares (LMS) bridge.

16. The invention as recited in claim 13, wherein the apparatus comprises a switch coupled between the impedance measuring circuit and an output node of the driver, wherein the switch couples the impedance measuring circuit to the output node of the driver by changing from a high impedance state at the node to a low impedance state at the node.

17. The invention as recited in claim 16, wherein the switch is embodied as a T-gate switch.

18. The invention as recited in claim 16, wherein the transmission media is at least one of coaxial cable, copper-plated waveguide, copper/dielectric laminate transmission line, and micro-strip transmission line.

19. The invention as recited in claim 13, wherein the de-emphasis controller is configured to read a set of de-emphasis settings from memory corresponding to the measured line impedance and a type of the transmission media, and is configured to provide the set of de-emphasis stings to a gain circuit of the driver.

20. A machine-readable storage medium, having encoded thereon program code, wherein, when the program code is executed by a machine, the machine implements a method for setting de-emphasis of a transmitter driver coupled to a receiver through a transmission media, comprising the steps of:
coupling, based on a control signal from a bridge circuit, an impedance measuring circuit to the transmission media, the receiver in a high-impedance state, thereby enabling an impedance switch;
enabling, through a de-emphasis controller, the impedance measuring circuit;
measuring, by the impedance measuring circuit, at least one of a line impedance and a line length of the transmission media, the transmission media an unbalanced load; and
setting, by the de-emphasis controller, gain of the driver based on the measured at least one of the line impedance and the line length.

* * * * *